(12) United States Patent
Khivantsev et al.

(10) Patent No.: US 11,857,950 B2
(45) Date of Patent: Jan. 2, 2024

(54) HYDROTHERMALLY AND THERMALLY STABLE CATALYTIC MATERIALS BASED ON THETA-ALUMINA

(71) Applicant: BATTELLE MEMORIAL INSTITUTE, Richland, WA (US)

(72) Inventors: Konstantin Khivantsev, Richland, WA (US); Libor Kovarik, West Richland, WA (US); Janos Szanyi, Richland, WA (US); Yong Wang, Richland, WA (US); Ja-Hun Kwak, Richland, WA (US); Nicholas R. Jaegers, Richmond, CA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 0 days.

(21) Appl. No.: 17/528,849

(22) Filed: Nov. 17, 2021

(65) Prior Publication Data
US 2022/0152585 A1 May 19, 2022

Related U.S. Application Data

(60) Provisional application No. 63/114,559, filed on Nov. 17, 2020.

(51) Int. Cl.
| | |
|---|---|
| *B01J 21/04* | (2006.01) |
| *B01J 23/44* | (2006.01) |
| *B01J 23/46* | (2006.01) |
| *B01J 35/06* | (2006.01) |
| *B01J 35/10* | (2006.01) |
| *B01J 37/02* | (2006.01) |
| *B01J 37/08* | (2006.01) |

(52) U.S. Cl.
CPC .......... *B01J 21/04* (2013.01); *B01J 23/44* (2013.01); *B01J 23/464* (2013.01); *B01J 35/06* (2013.01); *B01J 35/1014* (2013.01); *B01J 37/0207* (2013.01); *B01J 37/088* (2013.01)

(58) Field of Classification Search
CPC . B01J 21/04; B01J 23/44; B01J 23/464; B01J 35/06; B01J 35/1014; B01J 37/0207; B01J 37/088
USPC ............... 502/332–334, 339, 355, 415, 439
See application file for complete search history.

(56) References Cited

U.S. PATENT DOCUMENTS

| | | | | | |
|---|---|---|---|---|---|
| 3,108,888 | A | * | 10/1963 | Bugosh | C01F 7/021 423/625 |
| 3,615,207 | A | * | 10/1971 | Lee | C01B 15/023 502/333 |
| 3,635,841 | A | * | 1/1972 | Keith | C01B 15/023 502/333 |
| 4,231,900 | A | * | 11/1980 | Kato | C04B 41/87 502/355 |

(Continued)

*Primary Examiner* — Cam N. Nguyen
(74) *Attorney, Agent, or Firm* — Derek H. Maughan

(57) ABSTRACT

A material and a method of making hydrothermally stable (catalytic) materials on the basis of theta-alumina support that is thermally and hydrothermally stable up to 1,150 C with metal, mixed metal-, metal-oxide nanoparticles dispersed upon it. Such materials did not lose significant amounts of their catalytic activity at temperature ranges for industrially relevant applications (including hydrocarbon oxidation, nitric oxide reduction, carbon monoxide oxidation) even after hydrothermal aging up to 1,150° C.

8 Claims, 8 Drawing Sheets

(56) References Cited

U.S. PATENT DOCUMENTS

| | | | | |
|---|---|---|---|---|
| 5,750,790 | A * | 5/1998 | King | C07D 295/023 564/469 |
| 5,965,481 | A * | 10/1999 | Durand | B01J 23/83 502/304 |
| 7,276,540 | B2 * | 10/2007 | Espinoza | B01J 37/08 518/718 |
| 8,877,673 | B2 * | 11/2014 | Garg | B01J 35/1042 423/653 |
| 8,962,897 | B2 * | 2/2015 | Zhang | B01J 23/44 502/355 |
| 10,577,243 | B2 * | 3/2020 | Ide | B01J 8/0438 |
| 10,737,244 | B2 * | 8/2020 | Serban | B01J 38/02 |
| 2009/0208396 | A1 * | 8/2009 | Yang | B01J 35/10 423/247 |
| 2012/0165185 | A1 * | 6/2012 | Gramiccioni | B01J 37/0248 502/217 |

* cited by examiner

HYDROTHERMALLY AND THERMALLY STABLE CATALYTIC MATERIALS BASED ON THETA-ALUMINA

PRIORITY

This application claims priority from a provisional patent application No. 63/114,559 entitled Hydrothermally and Thermally Stable Catalytic Materials Based on Theta-Alumina and Various Metals Supported on Thetaalumina filed Nov. 17, 2020, the contents of which are incorporated in their entirety by reference.

STATEMENT AS TO RIGHTS TO DISCLOSURES MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

BACKGROUND OF THE INVENTION

Industrial catalytic materials (especially in automotive industry) require the ability to sustain their catalytic functions after exposure to high temperatures in the presence of water, meaning they should be thermally and hydrothermally stable. Typically, materials used as catalysts to mitigate harmful emissions (including but not limited to hydrocarbons, methane, nitric oxides and carbon monoxide) for diesel and gasoline are based on gamma-alumina and other transition aluminas. Those materials include alumina support (which can be either gamma, or a mixture of theta-delta alumina) and (in some cases) other metal dispersed on the surface of alumina. Gamma-alumina itself is not stable and at temperatures above 800° C. begins to evolve into a mixture of delta-theta alumina at. This alumina phase evolution is continuous and creates a number of problems, including that: during phase transformation, the alumina surface becomes "mobile" and active metal structures on the surface have a tendency to get either covered by alumina (for example, for palladium, palladium oxide or palladium/platinum combinations) or dissolve into the bulk of alumina (for rhodium phases on alumina).

When these active structures on the surface are covered or dissolve, catalytic functions of the materials are lost. Thus, the problem arises—how can catalytic function be preserved by preventing alumina phase transformation and loss of active metal structures on its surface during harsh hydrothermal treatment?

Current attempts to solve this problem include the addition of metals like barium, which can be toxic, and rare-earth metals, which can be expensive, to attempt to stabilize the surface of gamma-alumina, slow down its phase transition. While this may be somewhat effective in reducing the transition and provide more stability than pure gamma-alumina, those materials still lose their activity. No alumina supported materials without additional dopants are known to survive aging at 1,000° C. or more without phase transformation and/or significant loss of surface area.

The present disclosure provides a description of a material and a method of making hydrothermally stable (catalytic) materials on the basis of theta-alumina support (which is thermally and hydrothermally stable up to 1,150 C as we discovered and has high surface area) with metal, mixed metal-, metal-oxide nanoparticles dispersed on it. Such materials did not lose significant amounts of their catalytic activity at temperature ranges for industrially relevant applications (including but not limited to hydrocarbon oxidation, nitric oxide reduction, carbon monoxide oxidation) even after hydrothermal aging up to 1,150° C.

This very stable theta-alumina material made by simple heating of a pre-selected boehmite or gamma-alumina materials in a temperature range 1,000-1,150° C.—has not, to the best of our knowledge, been demonstrated before. This resulting material has a similar high surface area as its precursor (boehmite or gamma-alumina). It is useful for supporting metal, mixed metal and metal oxide nanostructures, however, because there is no delta-phase impurity which leads to continuous evolution of the alumina phase, theta-alumina itself and metals supported on theta alumina (as catalysts for methane and hydrocarbon oxidation, nitric oxide reduction and other processes) do not lose significant portion of their activity even after hydrothermal aging up to 1,150° C.

It is believed that such materials are suitable candidates for automotive, mechanical and catalytic which expose the samples to harsh thermal and hydrothermal conditions. Results of testing demonstrate that these materials do not lose their structure and retain their desired catalytic properties during thermal and hydrothermal treatments up to 1,150° C.

Additional advantages and novel features of the present disclosure will be set forth as follows and will be readily apparent from the descriptions and demonstrations set forth herein. Accordingly, the following descriptions of the present disclosure should be seen as illustrative of the disclosure and not as limiting in any way.

SUMMARY

The present disclosure and description provide examples of method and catalysts made by that method that attempt to address the needs described above. In one example, a method for making a catalyst by heating a boehmite or gamma-alumina material to a temperature of at least 1000° C. is described. In some examples, the gamma-alumina precursor material is a material having a relative ratio of (100) facet of at least 20%, in some instances between 20 to 50%. The gamma-alumina or boehmite material may have a rod-like morphology. The material may be heated to at least 1,000° C. for a time between 0.1 to 1000 hours. The catalyst may be a pure theta-alumina material as defined by X-ray diffraction, having a surface area more than 20 m2/g that can survive hydrothermal aging up to 1150° C. without significant loss of surface area. In some instances, the catalyst may further comprises an element selected from the group consisting of rhodium and palladium, and may also contain metal oxide nanoparticles dispersed on the surface. In some instances, this surface may have a surface area between 20 and 100 m2/g.

Catalytic supports are also described wherein a pure theta-alumina material as defined by X-ray diffraction, having a surface area more than 20 m2/g can survive hydrothermal aging up to 1150° C. without significant loss of surface area. These catalytic material may further comprise elements and compounds supported on theta-alumina and may further contain rhodium and palladium as well as metal oxide nanoparticles dispersed the surface. The overall surface area is typically between 20 and 100 m2/g. In one example a method for making a catalyst is described wherein 0.5 wt % palladium precursor is loaded on to pure theta-alumina and heating to at least 600° C. In another example, a method for making a catalyst is described wherein at least 0.02 wt % rhodium precursor is loaded on pure theta-alumina and heated to at least 600° C.

Various advantages and novel features of the present disclosure are described herein and will become further readily apparent to those skilled in this art from the following detailed description. In the preceding and following descriptions I have shown and described only the preferred embodiment of the disclosure, by way of illustration of the best mode contemplated for carrying out the disclosure. As will be realized, the disclosure is capable of modification in various respects without departing from the disclosure. Accordingly, the drawings and description of the preferred embodiment set forth hereafter are to be regarded as illustrative in nature, and not as restrictive.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the disclosure of the application, which is measured by the claims, nor is it intended to be limiting as to the scope of the disclosure in any way.

DETAILED DESCRIPTION OF THE DISCLOSURE

The following description including FIGS. 1-9 show preferred embodiments of the present disclosure. It will be clear from this description of the disclosure that the disclosure is not limited to these illustrated embodiments but that the disclosure also includes a variety of modifications and embodiments thereto. Therefore, the present description should be seen as illustrative and not limiting. While the disclosure is susceptible of various modifications and alternative constructions, it should be understood, that there is no intention to limit the disclosure to the specific form disclosed, but, on the contrary, the disclosure is to cover all modifications, alternative constructions, and equivalents falling within the spirit and scope of the disclosure as defined in the claims.

Transition-Aluminas ($Al_2O_3$) are used as catalysts and supports for metals, metal oxides, nanoparticles, single atoms, especially in automotive applications. Vehicle conditions expose catalysts to extremely harsh conditions. Temperatures may reach above 1,000° C. in the presence of exhaust gases, oxygen and water steam. Gamma-alumina is most often used as a catalyst/catalyst support/mechanical binder. But with gamma-alumina, phase transformations (to theta/delta and alpha alumina phases) occur above 800° C. During the phase transformation, the surfaces become unstable, leading to deactivation of catalysts. This catalytic activity drop can be caused by alumina encapsulating the active phase (for example, in the case of palladium or its oxide) or by dissolution of the active metal in the alumina bulk (for rhodium, for example).

Heating typically leads to a phase transformation of gamma-alumina to a mixture of delta/theta phases before they finally transform to alpha-alumina. Phase transformation itself is a problem. Therefore, gamma-alumina catalysts significantly deactivate when exposed to water/steam conditions (hydrothermal aging) at 900° C. and above. The present invention overcomes this problem by utilizing pure theta-alumina with high surface area that has a high proportion of highly stable (100) facet and that accommodates a rod-like or lath-like morphology. It can be prepared by heating gamma-alumina or boehmite-precursor with rod-like or lath-like morphology at high temperature (1000° C. and above). These resulting theta-alumina supports are hydrothermally stable up to 1150° C. and based on x-ray diffraction they do not contain other transition-alumina phases.

Figure 1:
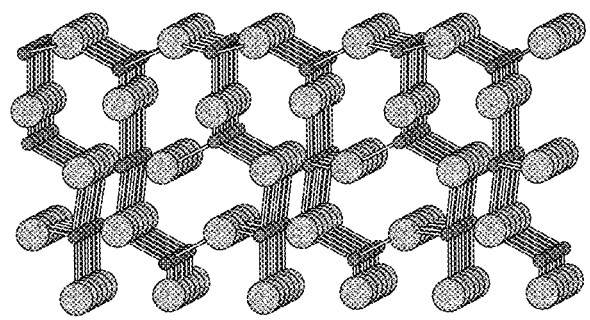
FIG. 1. shows a DFT-optimized (100) facet of theta-alumina.
Figure 2:
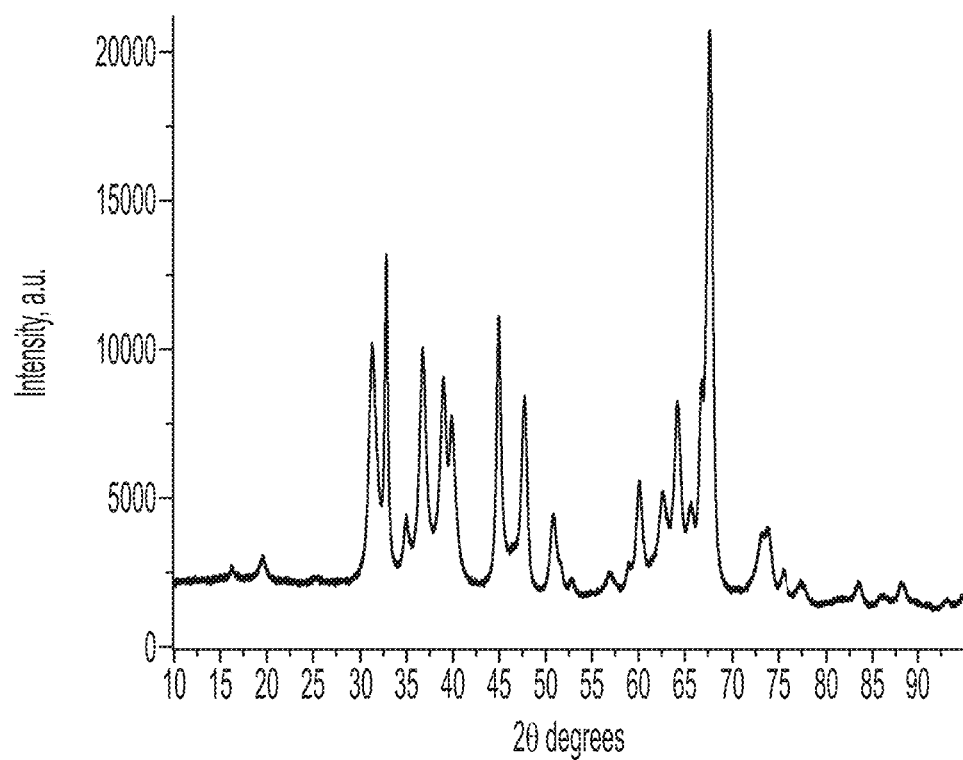
FIG. 2 shows XRD pattern of pure theta-alumina prepared from precursor with rod-like morphology
Figure 3:
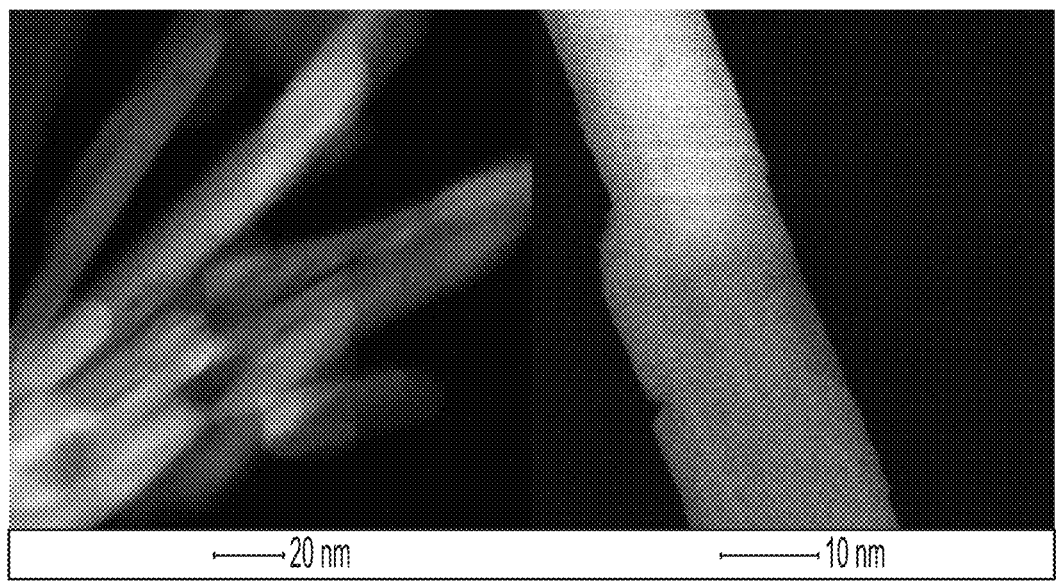
FIG. 3 shows representative microscopy images of theta-alumina sample FIGS. 4A-C. show activity of 3 wt % Pd/theta-alumina sample in methane oxidation before and after hydrothermal aging at 1,000° C.

Examples of such materials are shown in FIGS. 1, 2 and 3. FIG. 1 shows a DFT-optimized (100) facet of theta-alumina. The surface features alternating rows of tetra- and penta-coordinate Al atoms wherein oxygen; and aluminum atoms are intermixed. The surface energy of the facet is calculated to be 597 mJ/m2. FIG. 2 shows an XRD pattern of pure theta-alumina with rod-like morphology and surface area ~75 m2/g. This sample was prepared via thermal treatment of boehmite with rod-like morphology at 1,050° C. for 4 hours. FIG. 3 shows representative HAADF-STEM images of the theta-alumina sample whose x-ray diffraction patters is shown in FIG. 2. These crystals have rod-like morphology (the relative proportion of (100) facet is >20%).

In one example, a theta-alumina catalyst support was prepared from boehmite by heating in air at 1050° C. for 4 hours. Preferably the boehmite precursor has a relative ratio of (001) facet of 20% and more (and preferably between 30 to 50%). During heat treatment transformation of boehmite, the (001) facet of boehmite becomes (100) facet of theta-alumina. We calculated the surface energy of (100) facet of theta-alumina to be below 600 $mJ/m^2$: this extremely low value provides high stability (FIG. 1). Samples with a well-defined rod-like and lath-like morphology (transform into pure-theta alumina after heating at 1,000-1,150 C for duration between 0.1 to 1,0000 hours.

Transformation of boehmite to transition aluminas and transformation between transition aluminas (such as gamma, delta and theta-phases) are topotactic. Transformation of boehmite (or gamma-alumina) to theta-alumina is promoted by the presence of (100) facets of the resulting phase. Transformation of boehmite with initial morphology different than rod-like and lath-like (i.e., having lower proportion of (100) facets of the resulting phase than 20%) results in a mixture of multiple phases that evolves continuously with time at temperatures between 1,000 and 1,150 C. Because phase-transition of gamma-alumina into theta-phase is a topotactic transformation, no surface area loss occurs. The as synthesized theta-alumina has surface area between 10-150 m$^2$/g, preferably between 30 and 100 m$^2$/g. In one example, the sample area was 75 m$^2$/g. After hydrothermal aging (exposure to flow of air in 10% steam) theta-alumina maintains essentially the same surface area. In my particular embodiment, the theta-alumina sample hydrothermally aged at 1,000° C. for 16 hours has a surface area of 75 m$^2$/g.

This theta-alumina support can then be used to prepare hydrothermally and thermally stable catalysts for challenging catalytic applications. In one example, we loaded 3 wt % PdO nanoparticles (by total palladium weight) on high surface area theta-alumina and studied them for catalytic methane oxidation (we chose methane because among all hydrocarbons it represents the most challenging hydrocarbon to oxidize) and compared catalytic activities in methane oxidation of fresh (calcined at 600° C.), and this sample after hydrothermal aging at 800° C., 900° C., 1,000° C. ° C. in the flow of air and 10% steam. The catalytic testing results are summarized in FIG. 4 A-C. The initial rod-like morphology of theta-alumina is well-preserved after 1,000° C. hydrothermal aging. Examples and results are shown in FIGS. 4 and 5.

Figure 6:
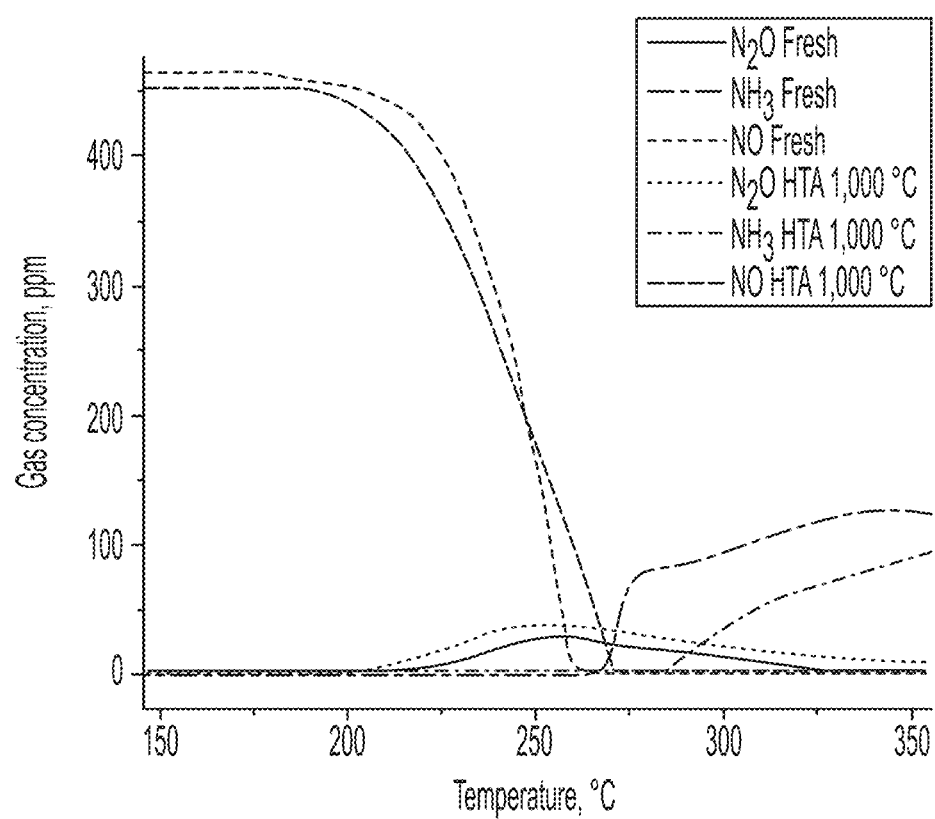
FIG. 6 shows nitric oxide (NO) reduction activity of fresh and hydrothermally aged 0.07 wt % Rh/theta-alumina sample.
Figure 7:
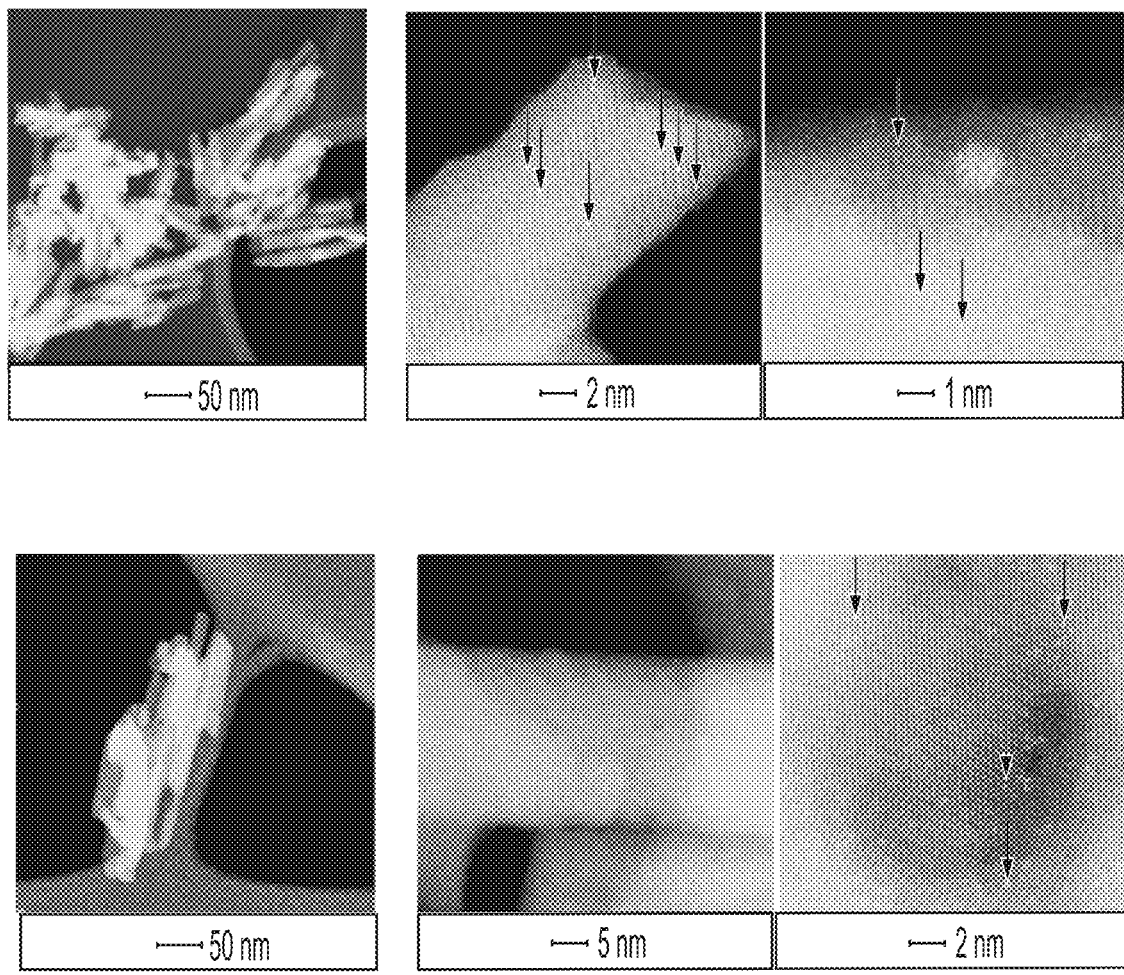
FIG. 7 shows microscopy HAADF-STEM images of 0.07 wt % Rh/theta-alumina sample (hydrothermally aged at 1,000° C. and then tested for NO reduction).

Rhodium supported on alumina is critical for reduction of nitric oxide. Nitric oxide is an environmental pollutant emitted by vehicles. Rhodium was loaded (0.07 wt %) on theta-alumina using conventional incipient wetness impregnation and the performance of the fresh (fresh means the sample was calcined at 600° C.) and hydrothermally aged (aged in the flow of air and 10% steam at 1,000° C. for 16 hours) samples was compared. Catalytic performance of the sample is shown in FIG. 6 As seen in FIG. 6, NO conversion remains robust after aging at 1,000° C. in the flow of air and 10% steam. This alleviates the well-known problem of alumina-rhodium catalysts deactivation due to dissolution of metal in the alumina bulk at elevated temperatures. FIG. 7 shows microscopy images of well-preserved theta-alumina morphology. FIG. 7 also shows that Rh atoms remain well-dispersed on the surface after severe hydrothermal aging.

These results are not limited to putting just rhodium or palladium on theta-alumina. They can be extended to combinations of any metal and non-metals with theta-alumina: such as palladium, platinum, rhodium, ruthenium, iron, silver, cerium, chromium, lithium, potassium, sodium, rubidium, cesium, magnesium, barium, calcium, strontium, lanthanum, praseodymium, boron, manganese, vanadium, cobalt, nickel, copper, gold, thallium, zinc, gallium, germanium, yttrium, zirconium, niobium, molybdenum, technetium, indium, tin, antimony, tellurium, scandium, tantalum, hafnium, tungsten, rhenium, osmium, iridium, lead, bismuth, fluorine, chlorine, bromine, praseodymium, neodymium, samarium, titanium, copper, silicon, phosphorus and multiple combinations thereof.

Because of the stable nature of the theta-alumina support (that does not lose surface area and undergo phase transformations under extremely severe thermal and hydrothermal conditions), the material can be used for any process requiring high thermal and hydrothermal stability. Our invention provides hydrothermally stable high surface area theta-alumina that does not require the use of rare earth metals and/or barium to assure its stability under hydrothermal conditions. Thus, we succeeded in preparing Rh and Pd-containing catalysts supported on theta-alumina active in NO reduction and hydrocarbon oxidation that can survive hydrothermal aging up to 1,150° C. with little-to-no deactivation. Results of this testing is shown in FIGS. 4 and 6.

Figure 8:
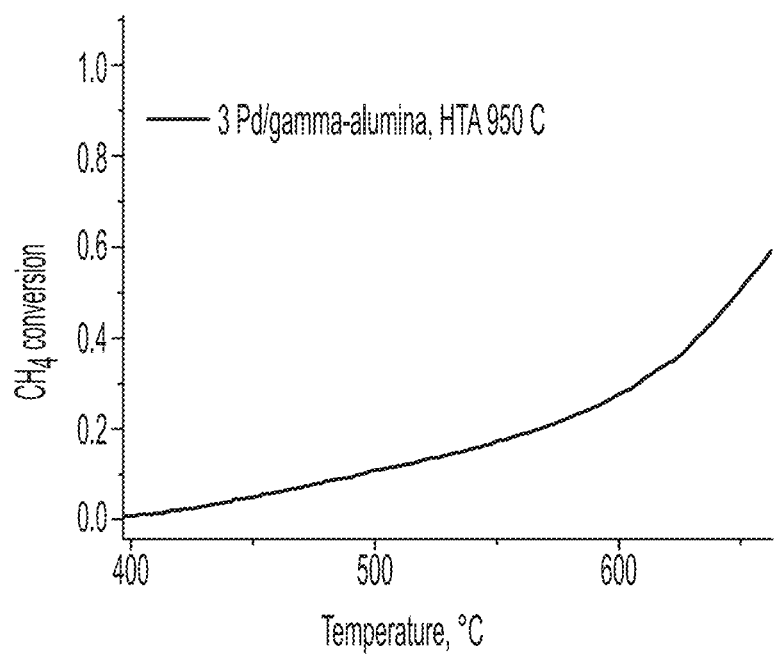
FIG. 8 shows methane combustion performance of 3 wt % Pd/gamma-alumina (SBA-200) sample after hydrothermal aging at 950° C.
Figure 9:
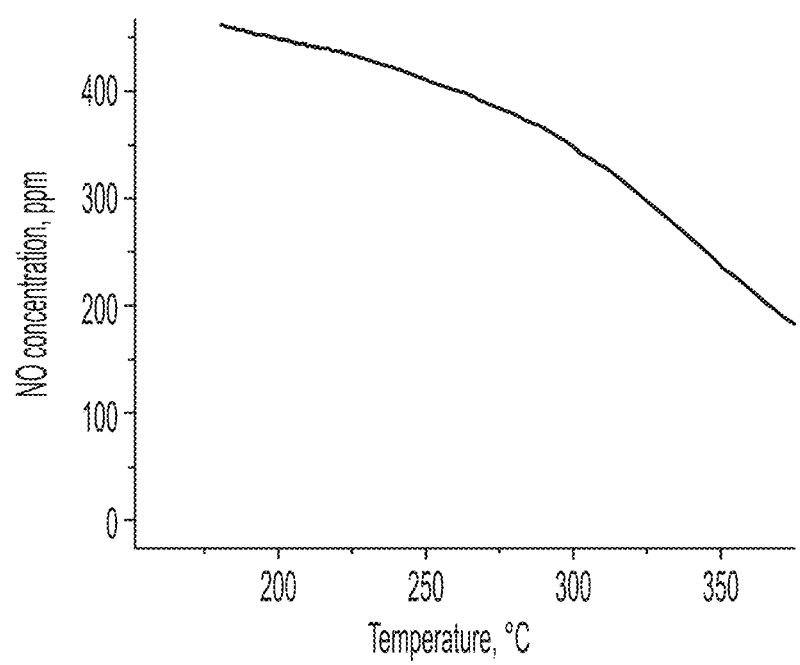
FIG. 9 shows NO reduction performance of 0.07 wt % Rh/gamma-alumina (SBA-200) sample that was hydrothermally aged at 1,000° C.

Typical high surface area commercial gamma-aluminas (such as SBA-200, surface area ~180 m$^2$/g) transform into a mixture of delta/theta above 900° C. and start forming low-surface-area alpha-alumina already at 1,000-1,150° C. When we supported similar loading of Rh (~0.07 wt %) and PdO (3 wt % Pd) on SBA-200 gamma-alumina, after hydrothermal aging at temperatures even below 1,000° C. these catalysts had lower activity in nitric oxide reduction and methane oxidation compared with Rh and Pd supported on high surface area theta-alumina after hydrothermal aging (FIGS. 8 and 9)

The use of transition Alumina in the form of theta-phase, (which is the most stable polymorph of transition Aluminas), and optimizing the morphology for high temperature stability provided significant advantages over the prior art.

Figure 4A:
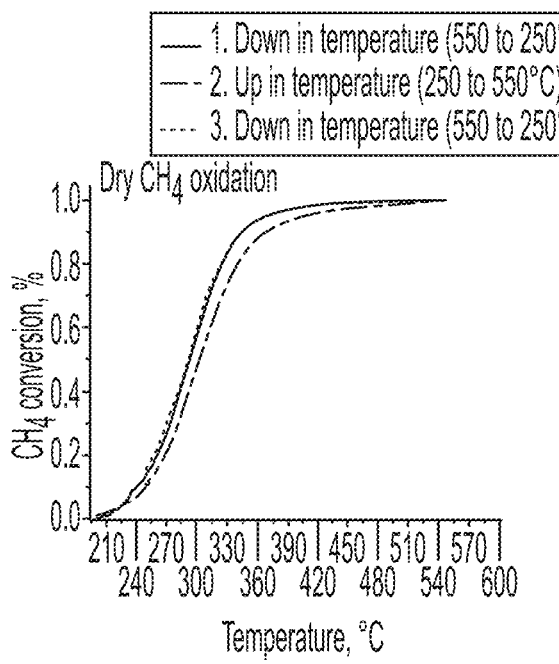
Figure 4B:
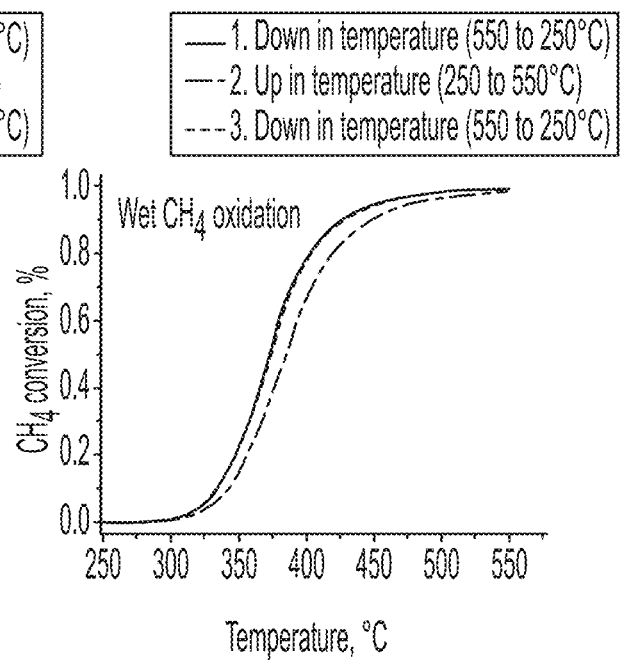
Figure 4C:
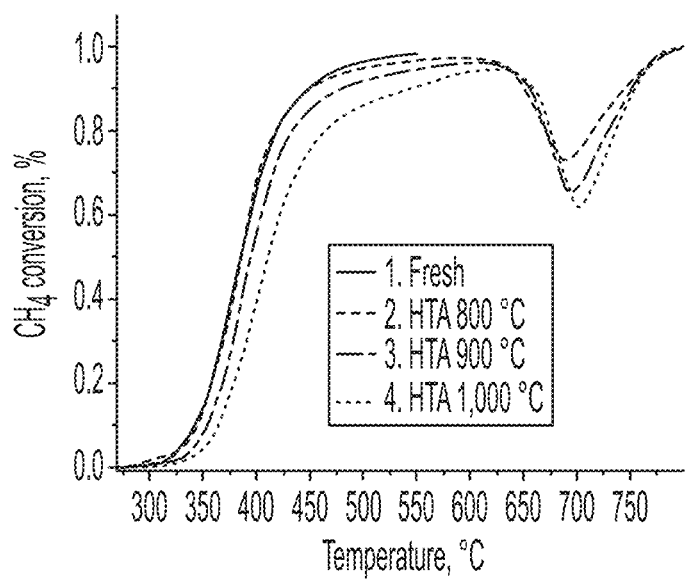
Figure 5:
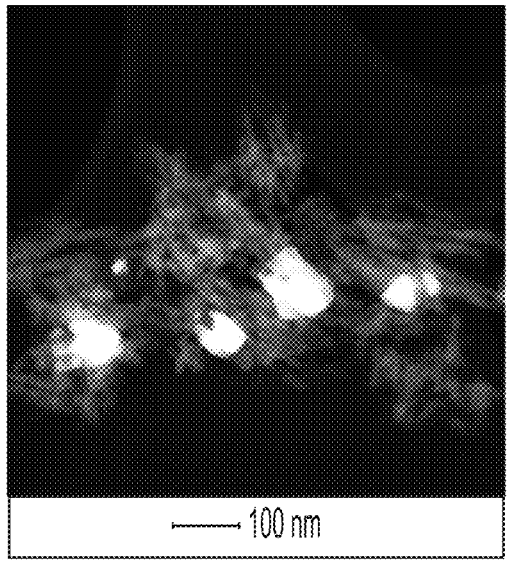
FIG. 5. shows microscopy HAADF-STEM images of the 3 wt % PdO/theta-alumina sample that was hydrothermally aged at 1,000 C.
Figure 5:
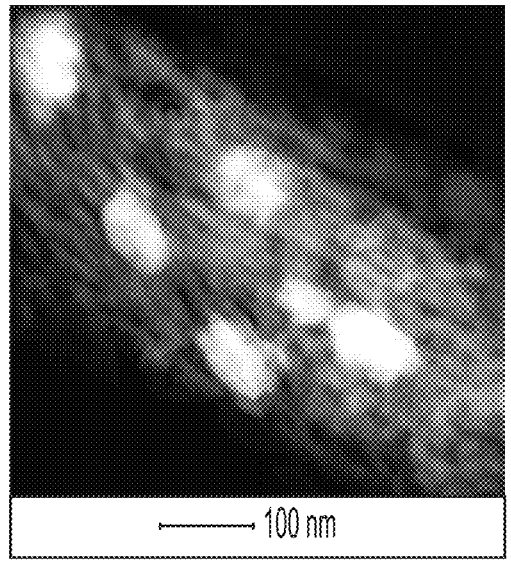
Figure 5:
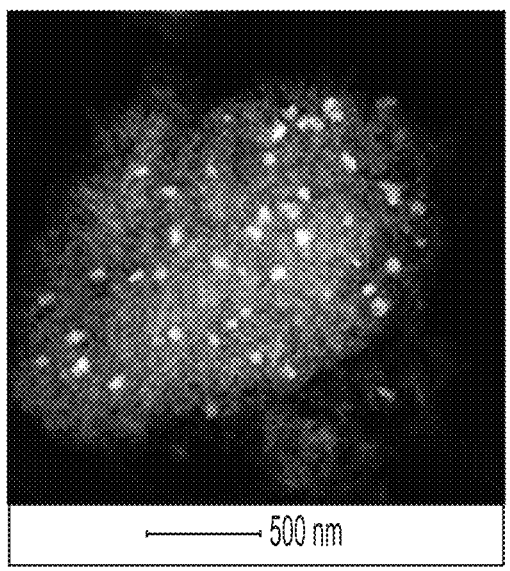
Figure 5:
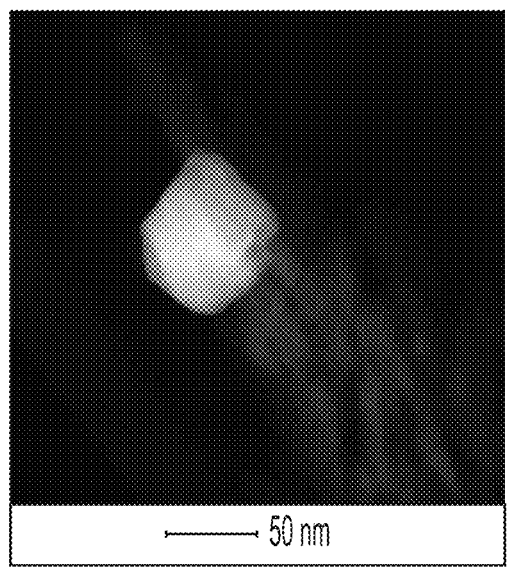

FIG. 4A-C shows activity of PdO on theta-alumina for methane combustion in the fresh state both under dry and wet conditions going up and down in temperature. The sample shows completely stable methane combustion activity. We then performed extremely harsh hydrothermal aging on this sample continuously in the presence of 10% H$_2$O/Air flow at each temperature for 16 hours (800, 900 and 1,000° C. aged). In this set of experiments, we noted that remarkably, the sample survives with little deterioration whereas typical Pd sample on SBA-200 gamma-alumina is considerably deactivated after 950° C. aging (FIG. 8). HAADF-STEM images of the sample in FIG. 5 after many hydrothermal aging cycles show that theta-alumina rods in 3 wt % Pd/theta-rods sample do not change and relatively large well-faceted PdO nanoparticles (that are needed for high activity due to (110) facets on PdO surface) are present.

FIGS. 6 and 7 show the activity and stability of single-atom Rhodium supported on theta-alumina sample with low (0.07 wt %) loading of Rh in NO reduction. The sample is active and stable, consistent with previous finding of catalytic activity of isolated Rh(I) ions for NO reduction by CO. Hydrothermal aging at 1,000° C. does not lead to any significant changes in activity unlike typical Rh/alumina samples (for which Rh is known to dissolve inside alumina during alumina phase-change; shown in FIG. 9), thus alleviating the previous problems for Rh-alumina supported samples that suffer high deactivation after hydrothermal aging. Mostly single Rh atoms are present on the sample after HTA treatment, with very few sub-nanometer sized Rh nanoparticles that could be found, consistent with preserved activity of this sample as shown in FIG. 7.

The method we describe based on pre-heating gamma-alumina or boehmite of varying morphologies to high temperature (1,000-1,150° C.) and ensuring complete structural evolution to the most stable transition alumina polymorphs, is a general method to produce high surface area alumina-containing materials with enhanced hydrothermal stability.

Pure theta-alumina can be used not only as a catalyst but as thermally/hydrothermally stable binder material. Due to its well-preserved morphology after aging and initial textural meso- and microporosity, it maintains its high permeance.

EXAMPLES

Rod-like boehmite was synthesized using the following method: Al(NO$_3$)$_3$·9H$_2$O (7.15 g) was dissolved in distilled water (80 ml). Then, glacial acetic acid was added to the solution. The resulting solution was transferred to a 125 ml Teflon-lined autoclave, sealed and kept at 200° C. for 12 hours. pH was adjusted with glacial acetic acid to ensure the pH was ~4 after 12 hours in the autoclave. After cooling to room temperature, the powder was collected by filtration, washed with distilled water, and dried at 200° C. The as-synthesized boehmite powder was then calcined at 800° C. for 2 h to convert it to rhombus-platelet γ-alumina with surface area of approximately 75 m²/g. Commercial SBA-200 γ-alumina from SASOL with surface area ~180 m²/g was used without additional pretreatment.

Rod-like γ-alumina was transformed into pure theta-alumina rods by heat-treating at 1,050° C. for 4 hours. Note that further heating this sample at 1,050° C. for longer time or at 1,150° C. does not lead to any change of the sample. γ-$Al_2O_3$(SBA-200) and theta-alumina (rod-like) were loaded with 3 wt % of Pd by wet impregnation (incipient wetness) using [Pd($NH_3$)$_4$](NO$_3$)$_2$ in water (10% by weigh solution). The sample was calcined in dry air flow at 600° C. for 5 hours to decompose nitrate. γ-$Al_2O_3$ (SBA-200) and theta-alumina (rods) were loaded with 0.07 wt % Rh using rhodium nitrate hydrate (36 wt % Rh) via incipient wetness impregnation. The sample was then dried and calcined 600° C. for 5 hours to decompose nitrate. The results of testing on these materials are described in the attached figures.

While various preferred embodiments of the disclosure are shown and described, it is to be distinctly understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A method for making a catalyst, the method comprising the step of:
   heating a boehmite or gamma-alumina material having a rod-like morphology to a temperature of at least 1000° C. to create a pure theta-alumina material, as defined by X-ray diffraction, having a surface area more than 20 m²/g that can withstand hydrothermal aging up to 1150° C. without significant loss of surface area.

2. The method of claim 1, wherein the rod-like alumina material has a relative ratio of (100) facet between 20 to 50%.

3. The method of claim 2, wherein the material is heated to at least 1,000° C. for a time between 1 to 20 hours.

4. The method of claim 1, further comprising the step of: placing an element selected from the group consisting of rhodium and palladium on to the surface of the theta-alumina material.

5. The method of claim 4, further comprising the step of: placing metal oxide nanoparticles on to the surface of the theta-alumina material.

6. The method of claim 5, wherein the catalyst has a surface area between 20 and 100 m²/g.

7. The method of claim 1 further comprising the step of: loading at least 0.5 wt % palladium precursor on to the pure theta-alumina material and heating to at least 600° C.

8. The method of claim 1 further comprising the step of: loading at least 0.02 wt % rhodium precursor on to the pure theta-alumina material and heating to at least 600° C.

* * * * *